(12) United States Patent
Zolman et al.

(10) Patent No.: US 8,381,852 B2
(45) Date of Patent: Feb. 26, 2013

(54) MULTIPLE BATTERY SYSTEM OF A MOTOR VEHICLE

(75) Inventors: Daron K. Zolman, Huntertown, IN (US); Nicholas A. Gollmer, Hicksville, OH (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 253 days.

(21) Appl. No.: 12/937,167

(22) PCT Filed: Apr. 20, 2009

(86) PCT No.: PCT/US2009/041063
§ 371 (c)(1),
(2), (4) Date: Oct. 8, 2010

(87) PCT Pub. No.: WO2009/131918
PCT Pub. Date: Oct. 29, 2009

(65) Prior Publication Data
US 2011/0031046 A1    Feb. 10, 2011

Related U.S. Application Data

(60) Provisional application No. 61/046,509, filed on Apr. 21, 2008.

(51) Int. Cl.
*B60R 16/04* (2006.01)
*H02J 7/14* (2006.01)
(52) U.S. Cl. .................... 180/65.285; 180/54.1; 320/104
(58) Field of Classification Search .................. 180/54.1, 180/285; 320/104
See application file for complete search history.

(56) References Cited

U.S. PATENT DOCUMENTS

| | | | |
|---|---|---|---|
| 5,977,652 A | 11/1999 | Frey et al. | |
| 6,222,341 B1* | 4/2001 | Dougherty et al. | 320/104 |
| 6,229,279 B1 | 5/2001 | Dierker | |
| 6,232,674 B1 | 5/2001 | Frey et al. | |
| 6,323,608 B1 | 11/2001 | Ozawa | |
| 6,545,445 B1 | 4/2003 | McDermott et al. | |
| 6,731,021 B1 | 5/2004 | Urlass | |
| 7,180,205 B2* | 2/2007 | Wirdel | 307/10.1 |
| 7,362,005 B2* | 4/2008 | Leblanc | 307/10.1 |
| 7,545,121 B2* | 6/2009 | Bolduc | 320/163 |
| 7,830,117 B2* | 11/2010 | Ambrosio et al. | 320/109 |
| 8,115,446 B2* | 2/2012 | Piccard et al. | 320/104 |
| 8,125,181 B2* | 2/2012 | Gregg et al. | 320/104 |

FOREIGN PATENT DOCUMENTS

| | | |
|---|---|---|
| CA | 2538646 A1 | 10/2006 |
| DE | 4028242 C2 | 8/1997 |
| WO | 2006112512 A | 10/2006 |
| WO | 2009131918 A1 | 10/2009 |

OTHER PUBLICATIONS

International Search Report and Written Opinion from corresponding application, PCT/US2009/041063, dated Aug. 31, 2009.

* cited by examiner

*Primary Examiner* — J. Allen Shriver, II
*Assistant Examiner* — Brian Cassidy
(74) *Attorney, Agent, or Firm* — Jeffrey P. Calfa; Mark C. Bach

(57) ABSTRACT

An electrical system for a motor vehicle includes first and second battery sets. The first battery set generally supplies power to vehicle electrical loads while the second battery set is used to energize the engine starter system. The vehicle's engine driven alternator is connected to recharge the first battery set. Recharging of the second battery set is provided by a charger connected to draw power from the first set and to transfer the power to the second set.

6 Claims, 3 Drawing Sheets

MULTIPLE BATTERY SYSTEM OF A MOTOR VEHICLE

REFERENCE TO A RELATED APPLICATIONS

This application claims the priority of U.S. Provisional Patent Application No. 61/046,509, filed 21 Apr. 2008.

TECHNICAL FIELD

The technical field relates to motor vehicle electrical systems and more particularly to a multiple battery system where the batteries are isolated by function.

BACKGROUND

In normal operation, electric starter motors for diesel engines intermittently draw a substantial quantity of power for brief periods. The lead-acid batteries designed to meet the relatively brief, high power draw characteristic of these electric starter motors do not exhibit good deep and high cycle characteristics. Repeated deep discharge of such "starter" or "high output" batteries can greatly shorten the useful life of the batteries. Starter batteries last substantially longer if the batteries are kept fully charged and high cycling and deep discharge of the batteries is avoided.

Supplying power for cold cranking of the engine is not the only power demand present on vehicles when the engine is off. Trucks used for long haul shipping and equipped with sleeper compartments may rely on battery supplied electrical power during periods when the vehicle's engine is not running and the alternator is not available to supply the electricity used for communication equipment, radios, lights, microwave ovens, televisions, computers, etc. Split or "dual" battery systems have been used where multiple batteries are installed on a vehicle with some of the batteries reserved for starting the vehicle and other batteries being used to supply electricity to electrical loads when the engine is not running. Canadian Patent Application No. 2 538 646 teaches a representative split battery system for a truck. There it was suggested that battery types be differentiated between starter batteries and high/deep cycle batteries tolerant of deep discharge to be used for longer duration, relatively steady loads.

Contemporary regulations relating to commercial motor vehicle drivers provide that drivers are to take at least 8 consecutive hours in the sleeper berth, plus 2 consecutive hours either in the sleeper berth, off duty, or any combination of the two. This differs from prior regimes where drivers using a sleeper berth were to take 10 hours off duty, but could split sleeper berth time into two periods provided neither was less than 2 hours. Long sleeper birth time and increasingly accessible DC power accessories appear to have resulted in an increase in vehicle electrical loads when the engine is not running and deeper discharging of vehicle batteries. There is also evidence of shorter duration runs of trucks with a consequential diminishment of full recharging of the starter batteries. These factors contribute to batteries not being fully charged and to high parasitic loads on the batteries pushing the batteries into high cycling and deep discharge conditions with consequential shortening of battery life.

SUMMARY

An electrical system for a motor vehicle includes first and second battery sets. The first battery set generally supplies power to vehicle electrical loads while the second battery set is used for the engine starter system. The vehicle's engine driven alternator is connected to recharge the first battery set and to meet vehicle electrical demand when the engine is running. Recharging of the second battery set is provided by a charger connected to draw power from the first set and to transfer the power to the second set whether or not alternator power is available.

DETAILED DESCRIPTION

Figure 1:
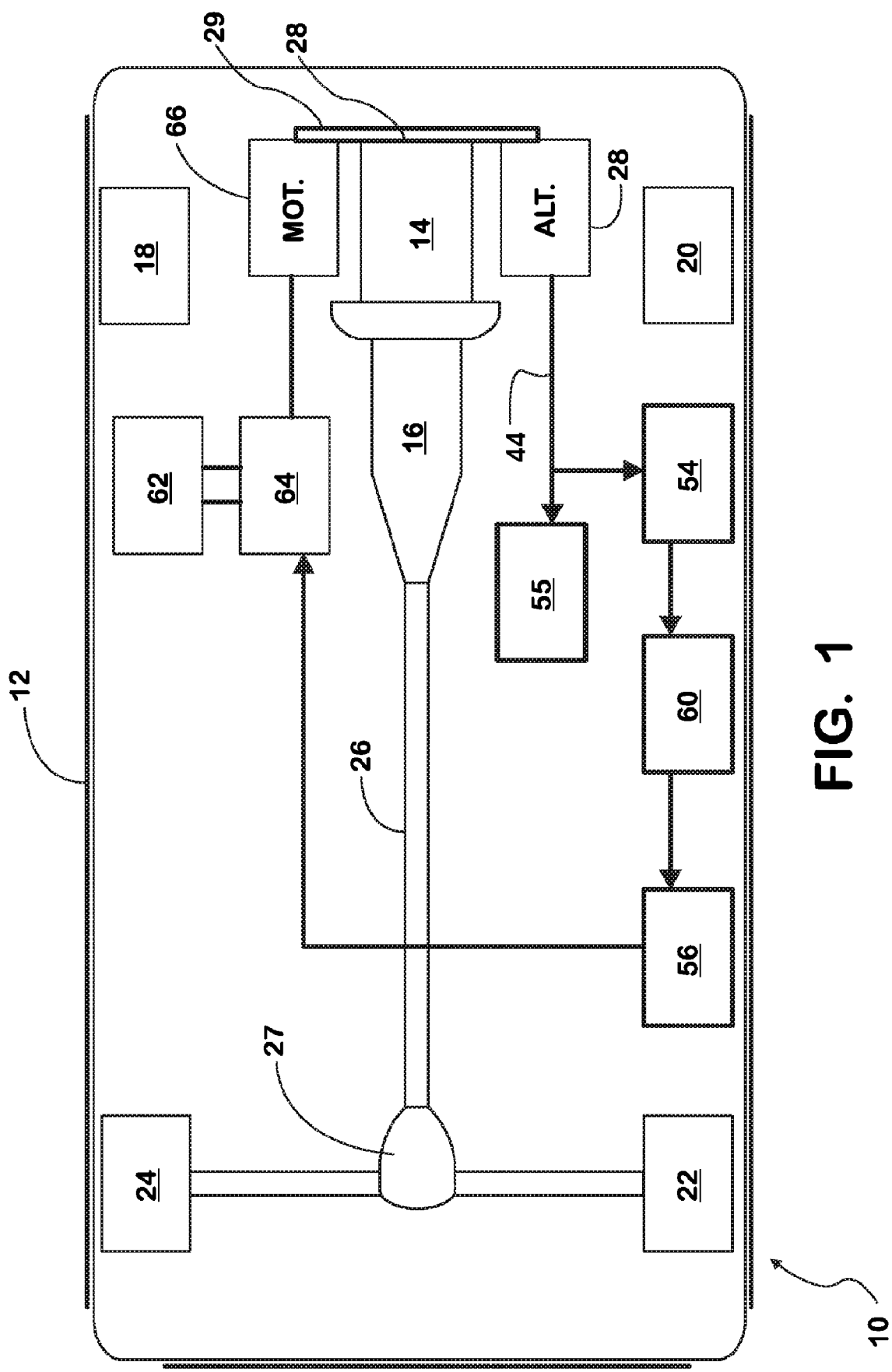
FIG. 1 is a block diagram schematic of a vehicle and elements of the vehicle's electrical system.

In the following detailed description, like reference numerals and characters may be used to designate identical, corresponding, or similar components in differing drawing figures. Furthermore, example sizes/models/values/ranges may be given. In circuit diagrams well-known power and ground connections, and similar well-known elements, may be omitted for the sake of simplicity of illustration.

FIG. 1 of the drawings shows a motor vehicle 10. A chassis 12 supports an internal combustion engine 14 which is connected by a transmission 16 and a drive shaft 26 to a rear end differential 27. Wheels 18, 20, 22, 24 are located at the four corners of the chassis 12 to provide support for the chassis 12 by a suspension system (not shown). Rear wheels 22, 24 receive torque for propelling vehicle 10 from differential 27. These components are conventional and are intended as illustrative of the environment of a vehicle electrical system.

Motor vehicle 10 is usually equipped with conventional 12 volt direct current (DC) electrical alternator 28 which is driven by a front engine accessory drive (FEAD) belt 27 off the engine 14. Alternative drive mechanisms for the alternator 28 are possible, such as a drive gear. A DC electric starter motor 66 is coupled by a mechanical linkage 29 to engine 14 to crank the engine for starting. Two battery sets are installed on motor vehicle 10, a hotel or electrical systems battery set 54 and a starter battery set 56. The system is not limited conceptually to systems using 12 volt alternators and batteries, though these are in common use at present. Most of the vehicle's electrical loads are carried by the electrical systems/hotel battery set 54 or the alternator 28. The starting load is substantially carried by the starter battery set 56.

Alternator 28 supplies direct current at a nominal 12 to 14 volts on a bus 44 to the hotel battery set 54 and an electrical power consumer 55, primarily representing cab electrical appliances, lighting and the like. When alternator 28 power is not available, primarily because engine 14 is not running, consumer 55 can draw power from battery set 54. Starter battery set 56 is charged from the hotel battery set 54 by a charger 60. Starter/cranking motor 66 draws power from the starter battery set 56 through a cranking motor solenoid 64 the state of which is controlled a starter magnetic switch 62.

Figure 2:
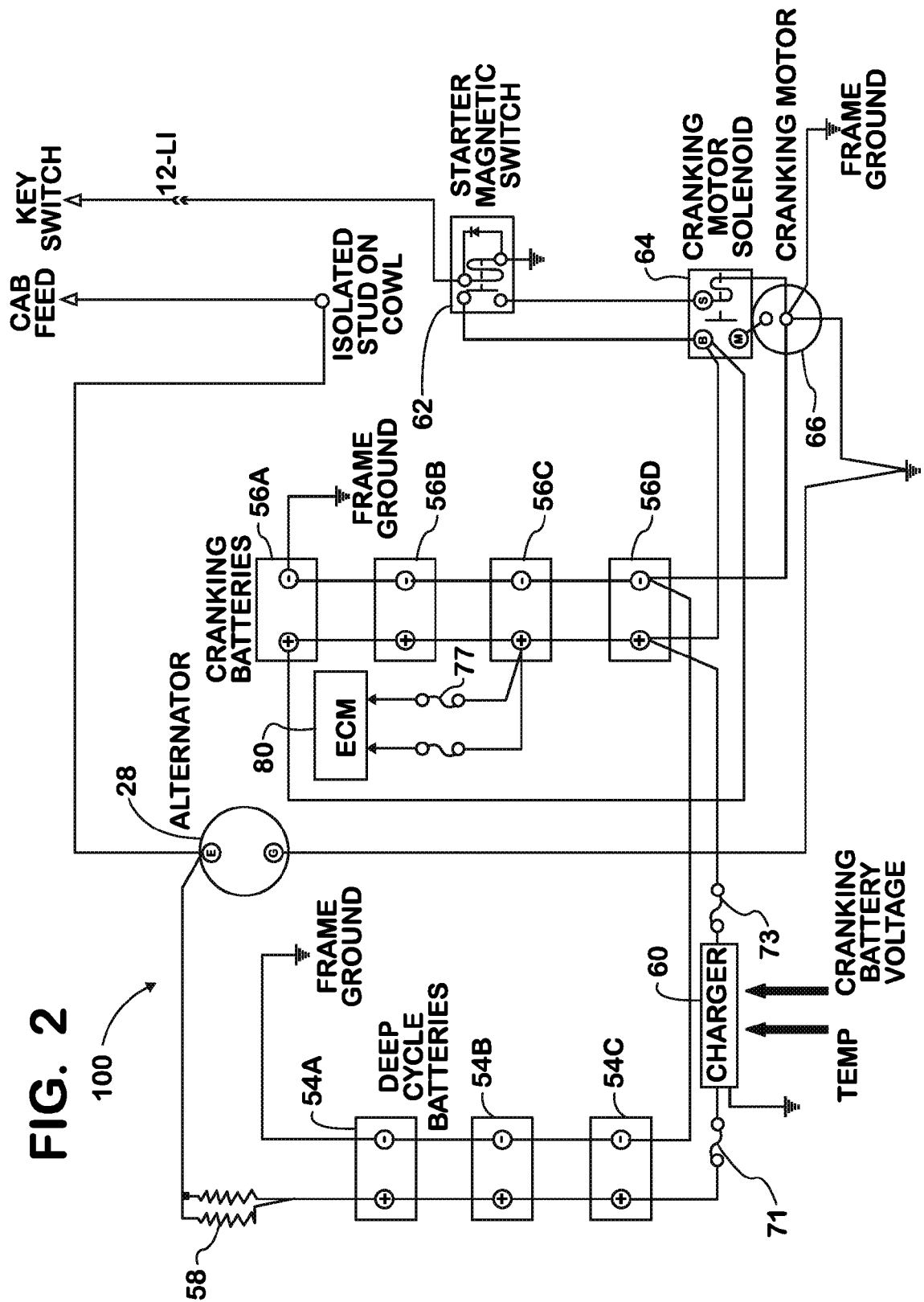
FIG. 2 is a circuit diagram of a split battery configuration and charging system for a vehicle electrical system.

Referring to FIG. 2, a vehicle 10 electrical system 100 includes a "4+3" split battery system 52 having three parallel connected, hotel batteries 54A-C and four parallel connected, cranking or starter batteries 56A-D. Hotel batteries 54A-C are usually high cycle batteries such as a lead acid type Absorbed Glass Mat (AGM) 12 volt batteries. Alternative types of high cycle batteries can also be used. Cranking batteries 56A-D can be lighter weight, conventional 12 volt lead acid batteries designed to meet large current flow for short durations. Hotel batteries 54A-C are electrically isolated from cranking batteries 56A-D with the only common connection from the two sets of batteries being to chassis or frame ground. The batteries within sets 54, 56 are connected in parallel by jumping the positive terminals to one another and similarly jumping the negative terminals one to another.

Alternator 28 is shown connected to supply power to the positive terminals of the three hotel batteries 54A-C by an optional fusible link 58 for recharging the batteries. Alternator 28 is electrically isolated from the cranking batteries 56A-D and is a remote sense alternator which obtains regulator voltage from the hotel batteries 54. The cranking batteries are recharged by a charger 60 which draws power from the hotel battery set 54A-C. Charger 60 operates to transfer power from hotel batteries 54A-C to cranking batteries 56A-D to keep the cranking batteries 56A-D fully charged. This occurs if the cranking battery 56 voltage indicates the cranking batteries 56A-D are in any state of discharge regardless of whether alternator 28 is supplying power to the hotel batteries 54A-C or not. Charger 60 can control the rate of charging of cranking batteries 56A-D based on various factors, including the degree of discharge of the batteries or their temperature. Typically battery voltage is used as a proxy for the battery state of charge. The charge voltage is usually varied in the inverse of the temperature of the batteries. This is done since the charge acceptance of lead acid batteries deteriorates as battery temperature falls. Charging voltage can be increased to maintain the charging rate as battery temperature falls. Typically ambient temperature is used as a proxy for battery temperature. Charging control could be made finer depending upon the data available. Charging rate is controlled by varying the output voltage of the charger 60. Charger 60 is connected between the positive terminals of battery 54C and battery 56D by current limiting fuses 71 and 73.

Cranking batteries 56A-D are largely isolated from most vehicle loads, excluding the starter circuit of cranking motor 66, cranking motor solenoid 64 and starter switch 62. The cranking batteries 56A-D are also isolated from the alternator 28 by hotel batteries 54A-C and charger 60. Outside of periods of cranking there should be relatively little electrical noise on the cranking battery 56A-D terminals. This makes the cranking batteries 56A-D a relatively clean source of power in the electrical sense and one having a highly stable output voltage. The cranking battery set 56 may be applied as a power source for some vehicle electrical loads, generally including electronics which exhibit low current draws and which might not perform properly if input voltage is excessively variable or noisy. An engine control module 80 connected to battery 56C by a pair of protective fuses 77 is a possible example of such a load or electrical consumer.

Figure 3:
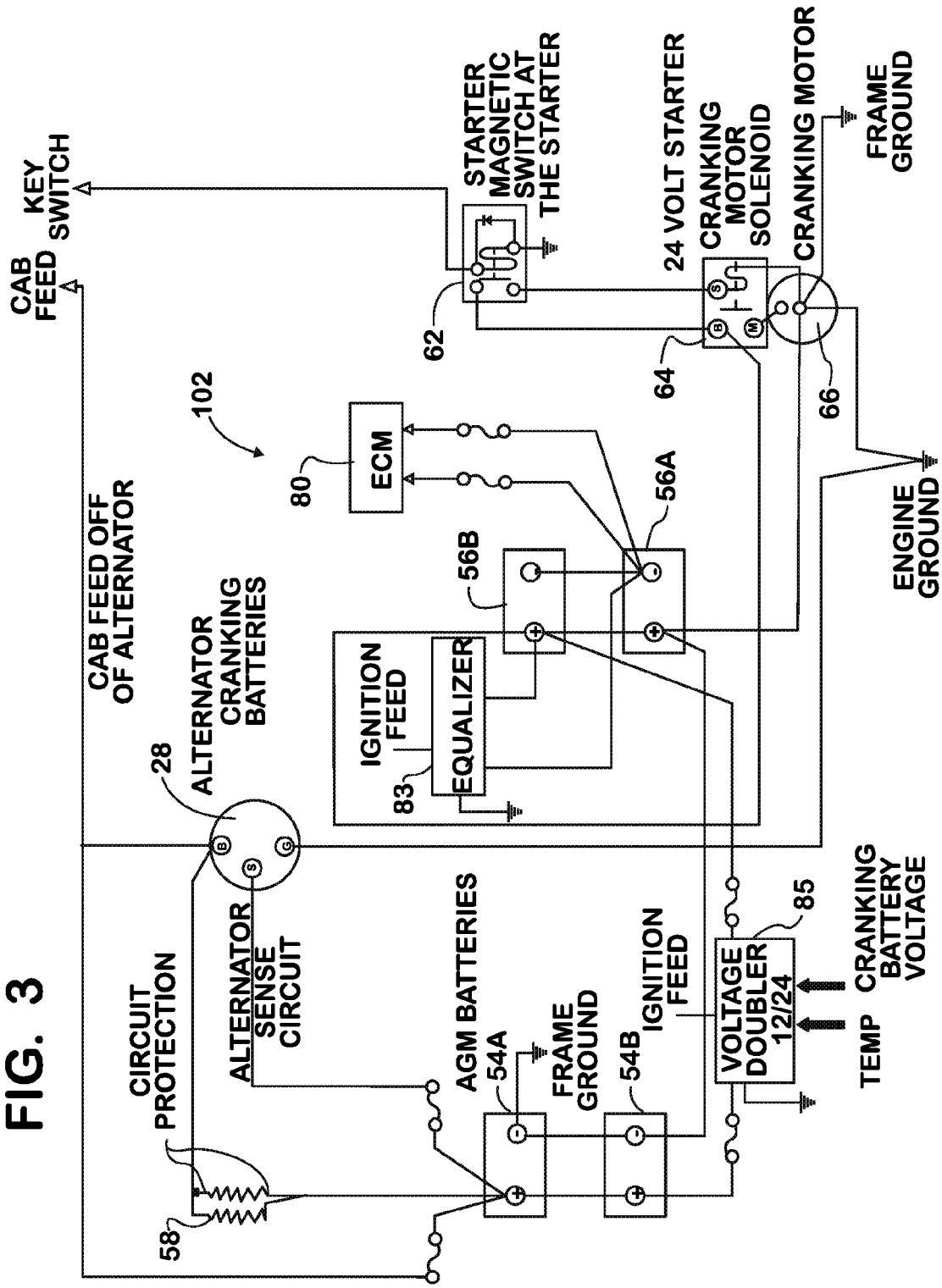
FIG. 3 is a circuit diagram of a split battery configuration and charging system for a vehicle electrical system.

Referring to FIG. 3, a vehicle electrical system 102 includes a split battery system having two parallel connected, hotel batteries 54A-B supporting 12 volt vehicle loads (cab feed) and two series connected, cranking or starter batteries 56A-B for a 24 volt DC starter system. Hotel batteries 54A-B are usually high cycle batteries such as a lead acid type Absorbed Glass Mat (AGM) 12 volt batteries. Alternative types of high cycle batteries can also be used. Cranking batteries 56A-B can be lighter weight, conventional 12 volt lead acid batteries designed to meet large short duration current flow. Hotel batteries 54A-B are electrically isolated from cranking batteries 56A-D. The batteries within set 54 are connected in parallel by jumping the positive terminals to one another and similarly jumping the negative terminals one to another. The batteries in the cranking set 56 are connected in series by jumping the positive terminal of battery 56A to the negative terminal of battery 56B. A voltage balancing equalizer 83 is connected to the positive terminals of both batteries 56A-B and operates to even the distribution of charge between cranking batteries 56A and 56B. Equalizer 83 operates to reduce the voltage difference between batteries 56A and 56B to under 0.1 volts. Engine control module 80 is connected to the first battery 56A in series to obtain a twelve volt source. The cranking battery set 56 is charged from a voltage doubling charger 85. Charger 85 may be set to transfer energy at a rate which keeps up with energy drain during cranking and sustaining loads from the engine and transmission feeds. The starter system is a 24 volt system, but otherwise is unchanged in layout from the 12 volt system with a starter magnetic switch 62, a cranking motor solenoid 64 and a 24 volt starter motor 66.

Alternator 28 is connected to supply power to the positive terminals of the two hotel batteries 54A-B by optional fusible links 58 for recharging the hotel battery set 54. Alternator 28 is electrically isolated from the cranking batteries 56A-B. The cranking batteries 56A-B are recharged by a voltage doubling charger 85 which draws power from the hotel battery set 54. Charger 85 operates to transfer power from hotel batteries 54A-B to cranking batteries 56A-B to keep the cranking batteries 56A-B fully charged. This occurs if the cranking battery set 56 voltage indicates the cranking batteries 56A-B are in any state of discharge regardless of whether or not alternator 28 is supplying power to the hotel batteries 54A-B. Charger 85 can control the rate of charging of cranking batteries 56A-B based on various factors, including the degree of discharge of the batteries or their temperature. Typically battery voltage is used as a proxy for the battery state of charge. The rate of charge is usually varied as the inverse of the temperature of the batteries. Charging rate is controlled by varying the output voltage of the charger 85. Charger 85 includes a DC to DC converter to provide the step up in voltage.

What is claimed is:

1. An electrical system for a motor vehicle comprising:
   a first electrical power storage sub-system;
   a power distribution system for auxiliary loads connected to draw power from the first electrical power storage system;
   a second electrical power storage sub-system having a nominal output voltage of a larger magnitude than a nominal output voltage of the first electrical power storage sub-system;
   electrical power generation means connected to charge the first electrical power storage sub-system;
   a voltage step up charger responsive to a state of charge of the second electrical power storage sub-system for transferring charge from the first electrical power storage sub-system to the second electrical power storage sub-system;
   an internal combustion engine starter system connectable to the second electrical power storage sub-system for energization;
   the first electrical power storage sub-system being a set of high cycle batteries with the high cycle batteries connected in parallel; and
   the second electrical power storage sub-system being a set of high output batteries with the high output batteries being connected in series.

2. An electrical system for a motor vehicle as set forth in claim 1, further comprising:
   the first electrical power storage sub-system being a set of high cycle batteries; and the second electrical power storage sub-system being a set of high output batteries.

3. An electrical system for a motor vehicle as set forth in claim 1, the voltage step up charger comprising a voltage multiplier and battery charger and the electrical system further comprising means for balancing the states of charge of the high output batteries.

4. A motor vehicle comprising:
an internal combustion engine;
an electrical starter system for the internal combustion engine;
a starter battery system connected to supply power on demand to the electrical starter system;
an electrical generator driven by the internal combustion engine;
an electrical systems battery system connected to be charged from the electrical generator;
electrical consumers connected to draw power from the electrical systems battery system and the electrical generator;
the starter battery system being operable at a voltage level of greater magnitude than the voltage level of the electrical system battery systems;
a step up charger system responsive to the state of charge of the starter battery system for transferring charge from the electrical systems battery system to the starter battery system;
the electrical systems battery system comprising a plurality of parallel connected high cycle batteries; and
the starter battery system comprising a plurality of parallel connected batteries.

5. A motor vehicle as set forth in claim 4, further comprising:
a temperature sensor; and
the step up charger system being further responsive to temperature readings supplied by the temperature sensor for controlling the rate of transfer of charge from the electrical systems battery system to the starter battery system.

6. A motor vehicle as set forth in claim 4, further comprising:
the electrical systems battery system comprising a plurality of parallel connected high cycle batteries;
the starter battery system comprising a pair of series connected batteries to operate at a multiple of the voltage of the electrical systems battery system; and
the step up charger system including means for stepping up the voltage from the electrical systems battery system to the starter battery system.

\* \* \* \* \*